United States Patent [19]

Ganguli

[11] Patent Number: 5,099,922
[45] Date of Patent: Mar. 31, 1992

[54] CONTROL OF GAS FLOW THROUGH CEMENT COLUMN

[75] Inventor: Kalyan K. Ganguli, Woodlands, Tex.

[73] Assignee: The Western Company of North America, Houston, Tex.

[21] Appl. No.: 675,309

[22] Filed: Mar. 26, 1991

[51] Int. Cl.⁵ .............................................. E21B 33/14
[52] U.S. Cl. .................................. 166/293; 106/725; 106/727; 106/819; 523/130; 166/295
[58] Field of Search ....................... 166/293, 294, 295; 106/724, 725, 727, 819; 523/130, 132

[56] References Cited

U.S. PATENT DOCUMENTS

| | | | |
|---|---|---|---|
| 3,926,257 | 12/1975 | Marrast et al. | 166/293 |
| 4,015,991 | 4/1977 | Persinski et al. | 166/293 |
| 4,486,562 | 12/1984 | Fischer et al. | |
| 4,537,918 | 8/1985 | Parcevaux et al. | 166/293 |
| 4,650,520 | 3/1987 | Johnsen et al. | 166/293 X |
| 4,671,883 | 6/1987 | Connell et al. | 166/282 |
| 4,674,574 | 6/1987 | Savoly et al. | 166/293 |
| 4,700,780 | 10/1987 | Brothers | 166/293 |
| 4,721,160 | 1/1988 | Parcevaux et al. | 166/293 |
| 4,742,094 | 5/1988 | Brothers et al. | 166/293 |
| 4,767,460 | 8/1988 | Parcevaux et al. | 166/293 |
| 4,791,989 | 12/1988 | Brothers et al. | 166/293 |
| 4,799,549 | 12/1988 | Vinot et al. | 166/293 |
| 4,806,164 | 2/1989 | Brothers | 166/293 |
| 5,016,711 | 5/1991 | Cowan | 166/293 X |
| 5,028,271 | 7/1911 | Huddleston et al. | 106/727 X |

Primary Examiner—George A. Suchfield
Attorney, Agent, or Firm—Peter A. Bielinski

[57] ABSTRACT

This invention involves cementing compositions for the oil industry and their use in cementing wells. More specifically, this invention involves the control of the gas migration or gas channeling phenomenon that occurs during the setting of a cement slurry. A cementing composition, capable of inhibiting gas channeling, comprised of gaseous fluid, hydraulic cement, and a gas channeling inhibiting additive comprised of a copolymer 2-acrylamido-2 methylpropane-3-sulphonic acid, N-vinylacylamide and acrylamide, is provided.

17 Claims, No Drawings

CONTROL OF GAS FLOW THROUGH CEMENT COLUMN

BACKGROUND OF THE INVENTION

1. Field of the Invention

This invention relates to cement compositions for the oil industry and a method for their use in cementing wells. In another aspect, this invention relates to the control of the gas migration or gas channeling phenomenon that occurs during the setting of a cement slurry.

2. Description of the Related Art

Gas channeling is a phenomenon that occurs during the setting of a cement slurry. Once the cement slurry begins to set, the hydrostatic pressure in the cement column begins to decrease. This reduction in hydrostatic pressure allows the channeling of gas through the partially set slurry. This gas, which is under pressure from the formation, flows through the partially set cement slurry creating microchannels. These microchannels can lead to safety problems when they extend to the surface.

One method used in an attempt to control gas channeling has been to include a styrene-butadiene latex in the cement. U.S. Pat. No. 4,537,918 describes a cement composition capable of inhibiting pressure gas channeling in which the slurry consists of cement, 5–30 weight % styrene/butadiene (30–70 weight %) copolymer latex, a latex stabilizer and water. However, this cement composition requires a minimum of 5% by weight of the cement of the styrene - butadiene latex creating problems of cost effectiveness. Thus, it is desirable to devise a cement composition that both prevents gas channeling and is more cost effective than known methods.

SUMMARY OF THE INVENTION

This invention provides cement slurry compositions capable of controlling the migration or channeling of gas that occurs during the setting of a cement slurry.

In one embodiment of the present invention, a cementing composition is provided that is capable of inhibiting pressure gas channeling. This composition comprises aqueous fluid, hydraulic cement, and a gas channeling inhibiting additive comprised of the copolymer 2-acrylamido-2-methylpropane-3-sulphonic acid, vinylacylamide, in the presence or absence of acrylamide.

In another embodiment, gas channeling inhibiting polymers of the present invention are provided comprised of the copolymer product of 2-acrylamido-2-methyl propane-3-sulphonic acid in an amount of from 5 to 95 percent by total weight of copolymer, vinylacylamide in an amount of from 5 to 95 percent by total weight of copolymer, and acrylamide in an amount of from 0 to 80 percent by total weight of copolymer. This copolymer is effective at well bottom hole temperatures ranging from 100° to 500° F., and is not adversely affected by brine.

In yet another embodiment of the present invention, there is provided a method of inhibiting gas channeling that occurs during the cementing of a casing in a borehole penetrating a high temperature subterranean formation comprising: introducing a cementing composition into the annulus between said conduit and said formation, said cementing composition containing a gas channeling inhibiting additive comprised of a copolymer of (1) 5 to 95 weight percent of 2-acrylamido-2-methylpropane-3-sulphonic acid; (2) 5 to 95 weight percent of a vinylacylamide; and (3) 0 to 80 weight percent of acrylamide; and allowing said cementing composition to set within said space.

In still yet another embodiment of the present invention, there is provided a cement slurry composition that contains, in addition to the 2-acrylamido-2-methylpropane-3-sulphonic acid/vinylacylamide/acrylamide additive, a gas channeling inhibiting amount of a styrene/butadiene latex copolymer. Preferably, the styrene monomer of the styrene/butadiene latex copolymer is substituted with at least one selected from the group consisting of carboxyl (—COOR), sulfonic (—SO$_3$R) and hydroxyl, wherein R is H or a C$_1$–C$_5$ alkyl group. Most preferably, a carboxylated styrene/butadiene latex copolymer comprising approximate equal amounts by weight of carboxylated styrene and butadiene is added in an amount up to about 20 percent by weight of cement.

DETAILED DESCRIPTION OF THE INVENTION

The composition of the gas channeling inhibitor of the present invention is comprised of an aqueous fluid, hydraulic cement and a polymer comprising the reaction product of the polymerization of 2-acrylamido-2-methyl propane-3-sulphonic acid (AMPS), vinylacylamide, and if appropriate, acrylamide.

More particular description of the invention is set forth below with respect to typical embodiments thereof, but the described embodiments should not be considered limiting of its scope, for the invention may admit to other equally effective embodiments which may be apparent from the description to one of ordinary skill in the art.

AMPS is present in the polymerization reaction product in acid or salt form in an amount of from about 5 to about 95 percent by total weight of copolymer. More preferably, AMPS is present in an amount from about 10 to about 90 percent by total weight of copolymer. Most preferably, AMPS is present in an amount of from about 60 to about 70 percent by total weight of copolymer.

Vinylacylamide is present in an amount of from about 5 to 95 percent by total weight of copolymer. More preferably, vinylacylamide is present in an amount of from about 7 to 80 percent by total weight of copolymer. Most preferably, vinylacylamide is present in an amount of from about 10 to 30 percent by weight.

Acrylamide is present in an amount of from about 0 to 80 percent by total weight of copolymer; more preferably, in an amount of from about 5 to 60 percent by total weight of copolymer. Most preferably, acrylamide is present in an amount of from about 10 to 30 percent by total weight of copolymer. Illustrative of the preferred polymer useful in the present invention is a terpolymer product available commercially from Hoechst Celanese under the trade name Hostamer ® V2825.

Although the amount of the gas channeling inhibitor admixed with the cement may be varied, the polymers generally are admixed with the cementing composition in an amount of from about 0.1 to about 5.0 percent by weight of the dry cement. Preferably, the gas channeling inhibitor is admixed with the cement in an amount of from about 0.5 to about 2.0 percent, and most preferably, from about 1.0 to about 1.5 percent weight of dry cement.

The gas channeling inhibitor of this invention is effective in high temperature wells. This additive is well suited for use in wells having a bottom hole temperature of from about 100° F. to about 500° F. The gas channeling inhibitor of this invention is effective even in the presence of salt water. Gas channeling inhibiting characteristics may be maintained in salt cement compositions, such as saturated NaCl and seawater, without changing the rheological properties of the cement. Indeed, these characteristics may be maintained at a cement salt concentration of up to approximately 38 percent or in seawater.

Cement compositions containing such gas channeling inhibitors display improved pumpability. This feature, in turn, enhances drilling fluid removal and decreases lost circulation when cementing a conduit.

The cement portion of the composition of this invention may be any of the API classes of cement as defined in the American Petroleum Institute Bulletin entitled "API Specification for Material & Testing for Well Cements" dated January 1982 ("API Spec. 10"), and incorporated herein by reference. These include cements defined as classes "G" and "H" in API Spec. 10.

Other types of well known and conventional additives may be incorporated into the cement composition, such as fluid loss additives or viscosifiers, retarders, accelerators, dispersants, weight-adjusting materials or fillers and the like. These additives may include, for example, (1) heavy weight additives, such as hematite, illmenite, silica flour and sand; (2) cement retarders such as lignins and lignosulfonates; and (3) additives for controlling lost circulation such as walnut hulls and cellophane flakes.

Styrene/butadiene latex copolymers may be added to the cement slurry composition. Generally, any styrene/butadiene latex copolymer effective in inhibiting gas channeling may be added to the composition. Preferably, the styrene monomer of the styrene/butadiene latex copolymer is substituted with at least one selected from the group consisting of carboxyl (—COOR), sulfonic (—SO$_3$R) and hydroxyl, wherein R is H or a C$_1$–C$_5$ alkyl group. Most preferably, a carboxylated styrene/butadiene latex copolymer comprising approximate equal amounts by weight of carboxylated styrene and butadiene is added in an amount up to about 20% by weight of cement. The preferred carboxyl is —COOH, and the preferred sulfonic is —SO$_3$H.

When the styrene/butadiene latex copolymer is added to the composition, concomitant use of an anionic high temperature dispersant with or without a latex stabilizer is required. The dispersant may be useful in dispersing the cement system. The preferred dispersant in this invention is a sulfonated styrene/maleic anhydride copolymer.

The latex stabilizer-anionic surfactant used may be any that generally prevents the coagulation of the styrene/butadiene particles. Preferably, the latex stabilizer used is Carbapon ®, a product available commercially from Hoechst Celanese consisting of organophosphonate and acrylate. Other potential latex stabilizers include (1) linear alkylbenzene sulfonate, (2) COCO fatty betaine, (3) polycarboxylic acid, (4) sodium dodecylbenzene sulfonate, and (5) ether-carboxylate. Other viable commercial materials found suitable are: (a) Hostapur ® DTC (Hoechst Celanese), (b) Pentex ® WS (Hoechst Celanese), (c) Chembetaine BW (Chemron Corp.), and (d) Frac Foam I (Special Products Corp.).

Use of this invention as a gas channeling inhibitor will result in significant reductions in gas migration or gas channeling rate. Under API standards, excellent gas channeling control (30–40 cc gas flow/min.) may be achieved by the addition of about 0.1 to about 1.7 percent by weight of the cement, of such gas channeling inhibitor to a normal dense cement.

EXAMPLES

Table 1 depicts the gas channeling inhibition produced by the polymers of the present invention. The copolymer consisting of AMPS, vinylacylamide, and acrylamide reduced gas flow to negligible levels. The carboxylated styrene/butadiene latex additive, in combination with the gas channeling inhibiting copolymer or by itself, reduced gas flow to very low levels.

Gas Migration Experiment: The gas migration control capabilities of the designed slurry was tested in a gas flow simulator. The gas flow simulator is a high temperature high pressure apparatus which monitors and records gas flow through the cement slurry under simulated well conditions. Details of the set-up of the gas flow simulator and the test procedure is described in the paper by R. M. Beirute and P. R. Cheung entitled "A Method for Selection of Cement Recipes to Control Fluid Invasion After Cementing," SPE Production Engineering (November, 1990), pp. 433–440.

Gas Permeability: Specific Permeability to gas was measured on the cement samples. A 1.5 inch diameter plug approximately 2 inches in length was drilled using water as the bit lubricant, trimmed to a cylindrical form, then dried in a convection oven at 180° F. overnight. The plug was subsequently loaded in a hydrastatic coreholder for permeability measurement at 1000 psig net overburden. Pre-purified nitrogen at 1000 psig upstream pressure was flowed through the core, and effluent flow was volumetrically measured and averaged to determine flow rate. Permeability was calculated using Darcy's law for compressible gases.

TABLE I

| System # | Test Temp °F. | Vol. of Gas Flow (cc/min) | Permeability md |
|---|---|---|---|
| A[1] | 140 | >1500 | 2.3 × 10$^{-4}$ |
| B[2] | 170 | negligible (N/M) | 3.2 × 10$^{-8}$ |
| C[3] | 230 | negligible (N/M) | 3.3 × 10$^{-5}$ |
| D[4] | 375 | 27 | 2.0 × 10$^{-7}$ |
| E[5] | 150 | 13 | N/M |
| F[6] | 200 | negligible (N/M) | 1.1 × 10$^{-7}$ |
| G[7] | 250 | 28 | 5.0 × 10$^{-5}$ |
| H[8] | 150 | 35 | 7.7 × 10$^{-8}$ |

[1]LeHavre ® H and water (an API class H cement)
[2]LeHavre ® H, .65% gas channeling inhibitor and water.
[3]LeHavre ® H, .94% gas channeling inhibitor and water.
[4]LeHavre ® H, 8.86% latex, water, 0.75% dispersant, 0.75% gas channeling inhibitor, and latex stabilizer.
[5]LeHavre ® H, 4.43% latex, 0.125% dispersant, 0.50% gas channeling inhibitor and water.
[6]LeHavre ® H, 4.43% latex, 0.25% dispersant, 0.50% gas channeling inhibitor and water.
[7]LeHavre ® H, 13.39% latex, 0.50% dispersant, water and 3.3% latex stabilizer.
[8]LeHavre ® H, 4.43% latex, 0.40% dispersant, 0.75% gas channeling inhibitor and water.
N/M - "not measured"

I claim:

1. A method of inhibiting gas channeling during the cementing of a casing in a borehole penetrating a high temperature subterranean formation comprising:
   introducing a cementing composition into the annulus between said conduit and said formation, said cementing composition comprising a gas channeling inhibiting additive comprised of a copolymer of (1)

5 to 95 weight percent of 2-acrylamido-2-methylpropane-3-sulphonic acid; (2) 5 to 95 weight percent of a vinylacylamide; and (3) 0 to 80 weight percent of acrylamide; and allowing said cementing composition to set within said space.

2. The method of claim 1 wherein the cementing composition further comprises:
  (a) a copolymer latex of about 50% by weight substituted styrene/50% by weight butadiene in an amount of from about 0% to about 4% by weight of cement, and wherein the styrene is substituted with at least one selected from the group consisting of —COOR, —SO$_3$R, and —OH, wherein R is H or a C$_1$–C$_5$ alkyl group;
  (b) a latex stabilizer in an amount of from about 0.1 to 1.0 percent by weight of cement; and
  (c) a dispersant.

3. The method of claim 2, wherein said latex stabilizer is a surfactant.

4. The method claim 3, wherein said surfactant is selected from a group consisting of organophosphonate, ether carboxylate, polycarboxylic acid and COCO fatty betaine.

5. The method of claim 3, wherein said surfactant is comprised of a mixture of organophosphonate and acrylate.

6. The method of claim 1 wherein the cementing composition further comprises:
  (a) a copolymer latex of about 50% by weight substituted styrene/50% by weight butadiene in an amount of from about 0% to about 4% by weight of cement, and wherein the styrene is substituted with at least one selected from the group consisting of —COOR, —SO$_3$R, and —OH, wherein R is H or a C$_1$–C$_5$ alkyl; and
  (b) a dispersant.

7. The method of claim 6, wherein said dispersant is sulfonated styrene maleic anhydride copolymer.

8. The method of claim 1, wherein said copolymer gas channeling inhibiting additive is present in an amount in the range of from about 0.1% to about 5.0% by weight of cement.

9. A method of cementing a conduit in a borehole penetrating a subterranean formation by introducing a cementing composition into the annulus between said conduit and said formation, said cementing composition comprising:
  (a) cement;
  (b) an aqueous fluid containing dissolved salt; and
  (c) a gas channeling inhibiting additive comprised of (1) a copolymer in the range of 60 to about 70 weight percent of 2-acrylamido-2-methylpropane-3-sulphonic acid; (2) in the range of about 10 to about 30 weight percent of a vinylacylamide; and (3) in the range of about 10 to about 30 weight percent of acrylamide.

10. The method of claim 9, wherein the cementing composition further comprises:
  (a) a copolymer latex of about 50% by weight substituted styrene/50% by weight butadiene in an amount of from about 0% to about 4% by weight of cement, and the styrene is substituted with at least one selected from the group consisting of —COOR, —SO$_3$R, and —OH, wherein R is H or a C$_1$–C$_5$ alkyl group;
  (b) a latex stabilizer in an amount of from about 0.1 to 1.0 percent by weight of cement; and
  (c) a dispersant.

11. The method of claim 10, wherein said latex stabilizer is a surfactant.

12. The method of claim 11, wherein said surfactant is selected from a group consisting of organophosphonate, ether carboxylate, polycarboxylic acid and COCO fatty betaine.

13. The method of claim 11, wherein said surfactant is comprised of a mixture of organophosphonate and acrylate.

14. The method of claim 10, wherein said dispersant is sulfonated styrene maleic anhydride copolymer.

15. The method of claim 9, wherein the cementing composition further comprises:
  (a) a copolymer latex of about 50% by weight substituted styrene/50% by weight butadiene in an amount of from about 0% to about 4% by weight of cement, wherein the styrene is substituted with at least one selected from the group consisting of —COOR, —SO$_3$R, and —OH, wherein R is H or a C$_1$–C$_5$ alkyl group; and
  (b) a dispersant.

16. The method of claim 9, wherein said copolymer gas channeling inhibiting additive is present in an amount in the range of from about 0.1% to about 5.0% by weight of cement.

17. The method of claim 9, wherein said aqueous fluid contains up to about 38% dissolved salt by weight of said aqueous fluid.

* * * * *